Aug. 2, 1960

C. F. ZAHNER ET AL 2,947,088

SIMULATED RADIO NAVIGATIONAL AIDS RECEIVER

Filed Oct. 28, 1958

INVENTORS
CHARLES F. ZAHNER
RALPH L. SAMSON

BY Norbert Ederer

THEIR ATTORNEY

Fig. 6

2,947,088
SIMULATED RADIO NAVIGATIONAL AIDS RECEIVER

Charles F. Zahner, Clifton, and Ralph L. Samson, Wyckoff, N.J., assignors to Curtiss-Wright Corporation, a corporation of Delaware Filed Oct. 28, 1958, Ser. No. 770,208

15 Claims. (Cl. 35—10.2)

This invention relates to flight training apparatus and more specifically to apparatus for the training of prospective flight crews in the operation of radio receivers found in an actual aircraft. The invention is particularly directed to simulation of the so-called low frequency receivers that occupy the frequency range of from 100 to 1750 kilocycles in four frequency bands.

Many commercial and military types of aircraft are commonly equipped with a low frequency radio receiver that is provided with a band selector switch operable to select the bands of 100–200, 200–410, 410–850, and 850–1750 kilocycles, and with a continuous tuning knob control common to the four bands for selecting in accordance with the knob position within the particular selected band, the particular tuning frequency the pilot or navigator desires to tune in for a radio navigational information, both aural and visual.

The aircraft receiver is provided with a stationary omni-directional antenna and a rotatable highly directional loop antenna. The former is employed for reception of the aural radio navigational aids signals emitted by a ground-based radio station and is generally effective to increase the strength of the audio signal with increasing proximity to the station and closer tuning. The loop antenna, quite on the contrary, tends to decrease strength of the received aural signal as its directivity pattern points angularly increasingly closer to the radio station or closer to an angle of 180° away from the station. When the limiting angles of 0° or 180° are reached, the receiver is silenced. Thus there exists an 180° ambiguity as to the antenna loop angle position; this the pilot or navigator may resolve by "fixing" the loop antenna on another station or by reverting to the omni-directional antenna, and in either case noting whether the signal strength is increasing or decreasing.

The receiver is further provided with a loop angle indicator for visual display of the loop antenna angle, also referred to as loop angle for brevity, with reference to the aircraft heading. At the instant of receiver silence, the indicator reflects the bearing of the aircraft relative to the station, subject however also to the 180° ambiguity. The indicator is a further aid in resolving the ambiguity in view of the changing angular indication as the flight progresses.

The two antennas admit of the following modes of operation: "Antenna," in which the fixed antenna is operative whereas the rotatable antenna is effectively inoperative—this results in normal aural reception; "Loop," in which the fixed antenna is effectively rendered inoperative—here the loop antenna may be actuated so as ultimately to result in receiver silence when "fixed" on the station (subject to the aforesaid ambiguity), while the indicator reflects loop angle, the loop antenna being actuated by operation of a manual control switch and only during such actuation; and "Compass" or "ADF" (Automatic Direction Finder) in which both antennas are operative, the fixed antenna receiving normal intelligence for ultimate aural reception whereas the rotatable antenna automatically locks in on the radio aids station and always in the correct 0° (as opposed to the 180°) direction, thus automatically avoiding the ambiguity. In ADF the loop antenna and the loop indicator are actuated on a continuous basis so that the latter continuously reflects bearing angle. The three modes are selected by means of a selector switch which is provided with two additional positions to select the functions "off" and "on."

Further receiver characteristics and composite transmitter-receiver characteristics, especially "cone of silence" performance will be apparent from the subsequent description of the simulating apparatus.

Apparatus for simulating performance and operation of low frequency receivers as to one or more of the above modes of operations is known in the art, an example being the Patent 2,514,602, granted to P. E. Grandmont on July 11, 1950; also the Patents 2,721,397, 2,730,815, and 2,846,780, granted to J. E. Gallo on October 25, 1955, January 17, 1956, and August 12, 1958, respectively, although not necessarily primarily concerned with low frequency receiver simulation, describe receivers having constructional features similar to some of those of the receiver described herein.

The present invention is directed to improvements in the simulation of radio navigational receivers and has for its principal object provision of a simulated radio receiver that matches all of the performance characteristics of the actual receiver with high realism and fidelity, particularly in regard to behavior under conditions of "Antenna," "Loop," and "Compass" (ADF) operation, simulation of cone of silence characteristics, of variation of signal strength with tuning and with distance from the radio station, and of static and noise characteristics.

Another object of the invention is to provide a compact and efficient all-purpose low frequency receiving system, that is highly flexible particularly in regard to operation with any desired number of selectable simulated radio stations.

In the present specification, of which the appended claims form a part, the simulated flight, receiver, transmitter, etc. are upon occasion recited with the adjective "simulated" omitted for brevity.

The receiving system in accordance with the invention employs audio signals which are replicas of the signals used in actual flight practice, a carrier signal of supersonic frequency that is amplitude modulated with the audio signals, and electronic (as distinguished from electro-mechanical) automatic gain control signals in the form of analog direct voltages which vary the intensity of the modulated carrier. The automatic gain control signals are originally alternating analog signals, representative of the fictitious flight-radio station distance, detuning, loop angle etc., and are subsequently rectified and filtered to provide the required direct voltages. This is done primarily to avoid resort to direct coupled amplifiers and their well-known drift problems; it should be understood that provision of a complete direct voltage system for the gain control voltages is within the scope of the invention.

The direct voltage analog signals used herein have magnitude and polarity with respect to ground related linearly to the magnitude and sign of the variables represented thereby unless otherwise specified. The alternating voltage analog signals are generally also of positive or negative "polarity," i.e. are generally either in phase with or in phase opposition to a fixed reference voltage; the phase is representative of the sign of the represented variable. The magnitudes of the alternating analog voltages are similarly related linearly to the magnitude of the represented variable, unless otherwise specified.

In the interest of minimizing hum and cross-talk some of the original alternating gain control voltages are of 60 cycle line frequency and others of 400 cycles; here too, a single frequency system can be employed within the scope of the invention. Unless otherwise specified, an "A.C." voltage shall be deemed as of 60 cycle frequency.

The receiving apparatus in accordance with the invention also contemplates composite alternating and direct voltage input-output characteristics for the automatic gain control voltages, that are non-linear or composed of a plurality of linear segments of different slopes. To this end the apparatus hereinafter described features non-linear electronic function generators.

For a better understanding of the invention reference is made to the following more detailed description considered together with the accompanying drawings, in which the several figures considered as a unit illustrate a preferred embodiment of the invention; more specifically in which:

Fig. 3 is a block diagram of coordinate computing and conversion circuitry for supplying signals representative of the instant location of the simulated flight relative to the receiver;

The simulated radio receiver has an outward appearance of an actual receiver and as such is provided at its front panel with a tuning dial, a tuning control knob, a band selector switch, a further selector switch for selecting the aforementioned three operational modes and two additional functions, and other controls hereinafter specified. These front panel components are not illustrated in the drawings, but rather internal components that are ganged thereto are shown.

In the interest of simplifying the disclosure well-known circuitry is indicated in block form and reference is made to the literature illustrating such circuitry in schematic form. Also relays and their contacts are illustrated by means of a simplifying convention described hereinafter, whereby to permit tracing of the circuitry and understanding of the logical functioning by inspection. The several blocks are interconnected by signal leads and a common ground wire, but the latter is omitted in the drawings for clarity.

Figures 1, 2:
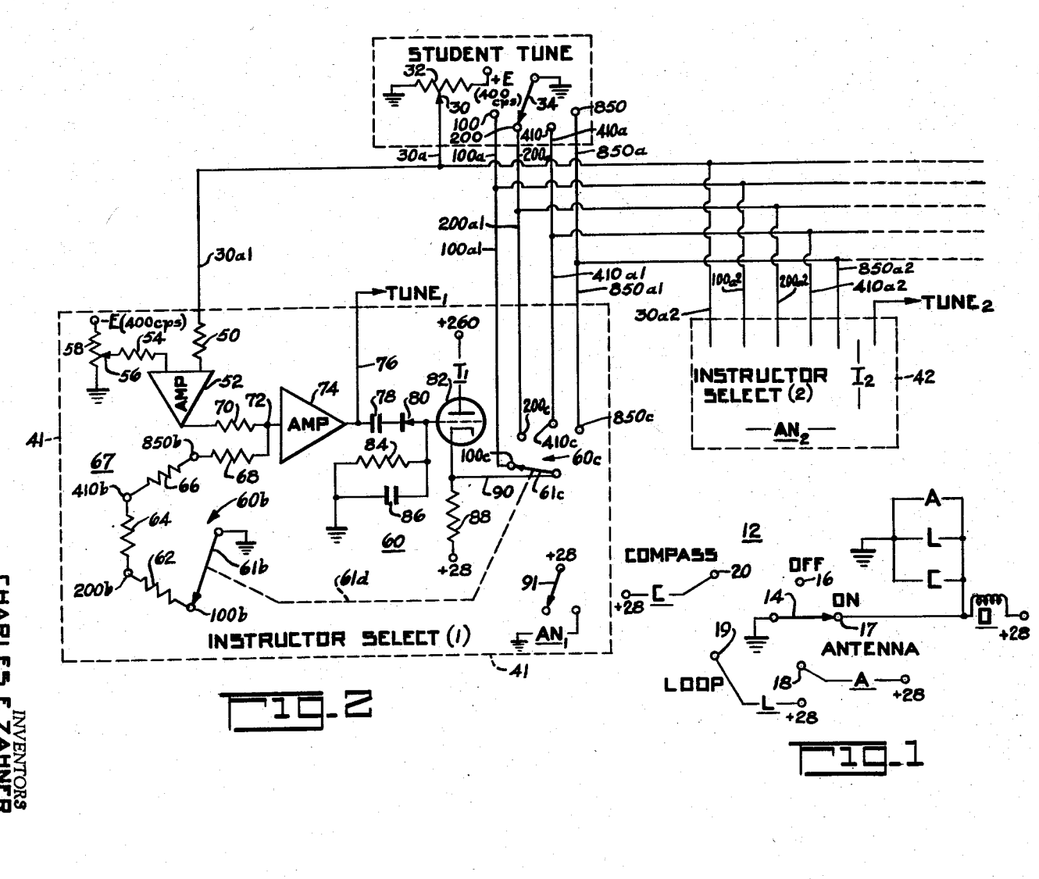
Fig. 1 is a schematic drawing of receiver operational mode selector circuitry and associated relays.
Fig. 2 is a schematic drawing of circuitry responsive to tuning and de-tuning of the receiver for generating tuning signals and controlling energization of tuning relays.
Figure 1:
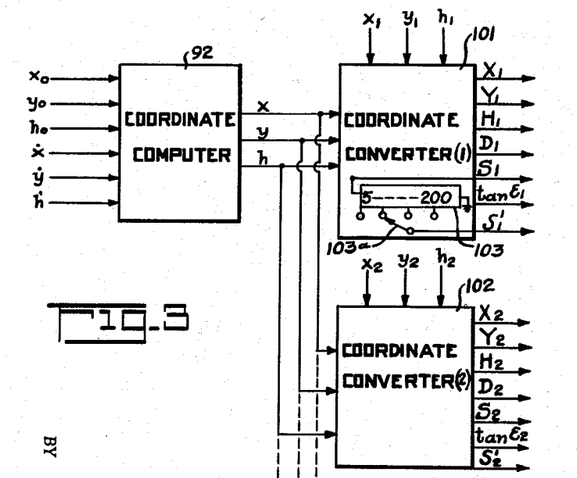

Referring to Fig. 1, reference numeral 12 designates a five position selector switch operable to select the five functions of "Off," "On," "Antenna," "Loop," and "Compass (ADF)." Switch 12 is provided with a moveable contact 14, whose one end is grounded and whose other end is connectable in sequence to the five stationary contacts 16–20 for selection of the respective functions. In the off position the receiver is disabled as will be seen hereinafter. In the "on" position contact 14 completes an energization circuit for an "On" relay designated by reference letter O, underlined. The circuit extends from a +28 volt. D.C. source through the relay coil and switch 14 to the ground. The remaining relays described herein will be simply indicated by a reference letter, underlined, and the conventional symbol for a relay coil omitted. Further to the end of facilitating comprehension of the logical arrangement, the "normally closed" (NC) contacts of a particular relay are identified by the reference letter of the relay coil with a bar thereabove, whereas the "normally open" (NO) contacts of such relay are identified simply by the same reference letter without bar above or below. These conventions are similar to the ones shown in the U.S. Patents 2,750,986 and 2,771,600. "Normalcy" as shown refers to the state of the relay with all sources of energization removed.

Reverting to consideration of Fig. 1, in the remaining positions of switch 12 energization circuits are completed by contact 14 for an antenna relay A, a loop relay L, and a compass relay C. Each such circuit extends from the +28 volt source through switch contact 14 and the respective stationary contact to ground. In general substantially consistently herein energization rather than deenergization of a relay signifies that the function reflected by the relay designation is performed. The O relay is provided with alternative energization circuits through the indicated NO contacts of the A, L and C relays. In other words the O relay is energized in all positions of the switch 12 except the off position.

Referring to Fig. 2, the tuning responsive control circuitry shown therein is conveniently presented in "student tune" and "instructor select" blocks to indicate the identity of the respective operators. The "student tune" block includes a wiper 30 of a potentiometer 32 which is grounded at one end and is connected to a 400 c.p.s. reference voltage +E at its other end. The wiper 30 is ganged to the tuning control knob. A moveable grounded contact 34 is ganged to the band selector switch and is positionable to engage the contacts 100, 200, 410 and 850 for selection of the bands 100–200 kc., 200–410 kc., 410–850 kc., and 850–1750 kc. respectively. The latter four contacts, and also wiper 30 are connected to respective outgoing lines 100a, 200a, 410a, 850a and 30a respectively, each of which branches out to branch lines of like reference numeral followed by the letter a, followed by the reference numerals 1, 2 etc. The number of such sets of branch lines, as well as the number of "instructor select" blocks 41, 42, etc. to which such branch lines lead, is equal to the number of radio stations made available for possible reception during the course of the flight training exercise.

The internal circuitry of block 41 is typical of the instructor selected radio stations; for this reason the second station 42 has been indicated simply in block form, and the remaining stations omitted.

Branch line 30a1 leads to a summing resistor 50 connected to the input of a summing amplifier 52 for summation of the signal derived from wiper 30 with another signal applied to the summing amplifier input through resistor 54 from a wiper 56 of a potentiometer 58. The latter is grounded at one end and is energized at its other end by the 400 c.p.s. reference voltage $-E$, which is of the same magnitude but of opposite phase to the reference voltage $+E$. The wiper 56 is preset by the instructor to tuning correspondence with the station he wishes to make available during the training exercise. The arrangement is such that when the student tuning matches the instructor's setting the net input voltage to the amplifier 52 is zero and otherwise deviates from zero in accordance with the degree of mistuning. It should be noted that the setting of the potentiometers 30 and 56 is without regard to band selection, but only with regard to correspondence of the instructor's and student's tuning controls 30 and 58. Accordingly separate switching means 60 are provided for matching of the band selection. Switch 60 comprises two wafers (60b, 60c) each of which is switchable to four positions in unison with the other. The wafers are provided with respective movable contacts 61b and 61c interconnected for unitary operation as by connection 61d. The contacts 61b and 61c are positionable for connection to respective contacts designated by 100, 200, 410 and 850 in correspondence with the like numbered contacts of the student selector switch 34 and followed by respective letters b and c to signify instructor's selection of the corresponding band.

The contact 61b is grounded, whereas series connected resistors 62, 64 and 66 are connected across the stationary contacts 100b and 200b, 200b and 410b, and 410b and 850b respectively. The resistors 62, 64 and 66 are part of an attenuating network that includes further series connected resistors 68 and 70, the latter having its other end connected to the output of amplifier 52. The attenuator output junction 72 of resistors 68 and 70 serves as an input to a further amplifier 74. The purpose of the attenuating network is to provide equal sensitivity per kilocycle of detuning on all four bands. It is noted that the spread of the first band is 100 kilocycles, that of the second band 210 kilocycles, that of the third band 440 kilocycles, and that of the fourth band 900 kilocycles. Since the band width of a station is fixed at 5 kc. regardless of the band, a unit rotation of the wiper 56 represents a progressively greater frequency change with selection of higher frequency bands. The amplifier 74 provides a tuning signal at output line 76, and this signal represents the same number of kilocycles per unit of dial-pointer rotation on all bands. This is assured by the attenuating network 67; it is readily seen that maximum voltage is applied to the junction 72 with switch 60b in the 100–200 kc. position and minimum voltage in the 850–1750 kc. position. The resistors 62–70 are selected to assure a 5 kc. pass band for all stations on all selector bands.

The output of the amplifier 74 is further coupled through a capacitor 78 to the cathode of rectifier diode 80 for rectification of the negative peaks to develop a negative bias at the grid of a triode 82 to which grid is connected the anode of diode 80 along with a charging network comprising parallel connected resistor 84 and capacitor 86 whose other ends are grounded. Conduction or non-conduction of the tube 82, and consequently energization and deenergization of a tuning relay $T_1$ connected from the plate of triode 82 to a +260 direct supply voltage, depend on the extent of detuning. The greater the mismatch between the positions of the wipers 30 and 56, the greater the output signal of amplifier 74, and therefore the greater the magnitude of the rectified negative voltage applied to their grid of tube 82. The arrangement is such that when the mistuning exceeds ±2.5 kilocycles the tube 82 is cut off in all events and therefore the relay $T_1$ is deenergized. If the de-tuning is less than ±2.5 kc. tube 82 will conduct and the relay $T_1$ will be energized provided however that the student's band selection matches the instructor's. The cathode of tube 82 is connected through a resistor 88 to the +28 direct voltage, and such voltage is sufficient to cut tube 82 off irrespective of the bias applied to its grid. The cut-off effect of the +28 voltage is overcome by matching of band selections, in which case the cathode of tube 82 is grounded via line 90, contact 61c, and one of the lines 100a1, 200a1, 410a1 and 805a1 which are respectively connected to the contacts 100c, 200c, 410c and 850c, and contact 34 provided the switches 61c and 34 are in corresponding positions for selection of the same band; otherwise the path to ground is open. As indicated the contact 61c is connected to contact 100c, whereas the contact 34 is connected to the non-corresponding contact 200 thereby necessarily cutting tube 82 off. If the student were to position contact 34 to the 100–200 kc. band, tube 82 may be rendered conductive and relay $T_1$ energized, provided the mis-matching of the wipers 30 and 56 corresponds to no more than ±2.5 kc. It is readily seen that the tube 82 and relay $T_1$ are an "AND" circuit means; they are respectively conducting and energized only on coincidence of matching of the band selection and matching within ±2.5 kc. of the dial positions.

The "instructor select" circuitry also includes a two position selector switch 91 whose movable contact is permanently connected to +28 volts and is positionable alternatively for connection to the indicated position and the alternate position illustrated respectively to deenergize an AN relay. The relay is connected across the latter contact and ground. Energization of the relay signifies that the radio station represented by block 41 is an AN Range station that is provided with a well-known "Cone of Silence" directly above and in the immediate vicinity of this station.

The second indicated "instructor select" block 42 is provided with a similar tuning relay $T_2$ and provides a similar tuning signal, and the same is true of any further added similar blocks. The last in the series of tuning relays and tuning signals is indicated by the subscript letter n in the subsequent drawing. It should be understood that in some instances such last relay and signal may be the second one in the series, or may be a higher number as dictated by the particular requirements of the aircraft navigation training apparatus.

Referring to Fig. 3, a co-ordinate computer 92 receives input analog A.C. voltages $x_0$, $y_0$ and $h_0$ that are preset by the instructor to correspond with the Cartesian coordinates of the point of flight takeoff. It further receives A.C. analog voltages $\dot{x}$, $\dot{y}$ and $\dot{h}$ from a flight computer, these three voltages being the instant velocity components of the flight in the Cartesian co-ordinate system. The latter three voltages are integrated within computer 92 and the integrated voltages are added to the $x_0$, $y_0$ and $h_0$ voltages to obtain at the output of computer 92 $x$, $y$ and $h$ analog A.C. voltages representing the instant location of the simulated flight. The internal structure of computer 92 per se forms no part of the present invention; for a detailed description of the manner of generation of its input and output voltages reference is made to a copending application of J. W. Steiner, Ser. No. 392,136, filed November 13, 1953, now Patent No. 2,878,585, granted on March 24, 1959.

Each of the output voltages of computer 92 is fed to a series of coordinate converters 101, 102, etc. of which there are provided as many as the number of "instructor select" blocks of Fig. 2, i.e. the number of radio stations available for the training exercise. The description of converter 101 is also applicable to converter 102 as recognized by the identity of corresponding reference letters which are followed by subscript 2 rather than 1, and is further applicable to any further added converters.

Converter 101 receives additional instructor adjusted analog A.C. input voltages $x_1$, $y_1$ and $h_1$ which represent the coordinates of the selected radio station. From the input voltages applied thereto converter 101 computes the following indicated analog output voltages representing like-named geographical factors:

$D_1$—This is the ground distance, sometimes also referred to as the bearing distance, from the instant flight position to the selected radio station;

$Y_1$—This is the vector component of $D_1$ along the instant aircraft heading axis;

$X_1$—This is the vector component of $D_1$ along an axis perpendicular to the instant aircraft heading;

$H_1$—This is simply $h-h_1$;

$S_1$—This is the slant distance between aircraft location and the selected radio station, equal to $\sqrt{D_1^2+H_1^2}$;

tan $\Sigma_1$—This is the tangent of the elevation angle of the aircraft with respect to the selected radio station, equal to $H_1/D_1$; and $S_1'$—This is a modified slant distance which takes into account the maximum transmission range of the selected radio station. The voltage $S_1'$ is obtained from the moveable contact 103a of a resistive stepped attenuator 103, that is grounded at one end, energized by the $S_1$ voltage at its opposite end, and is provided with a series of taps designated as 5–200, that correspond numerically to the number of miles of maximum transmission range. The taps are arranged in proper proportion so that a 5 mile range corresponds to maximum output voltage and a 200 mile to minimum output voltage. The contact 103a is positioned by the instructor to engage the particular tap corresponding to the required maximum transmission range.

The above mentioned output voltages of the converter 101 are A.C. voltages except for $D_1$ which is a direct voltage of negative polarity and as such is used for purposes of automatic gain control in the circuitry of Fig. 4 described hereinafter.

Figure 3A:
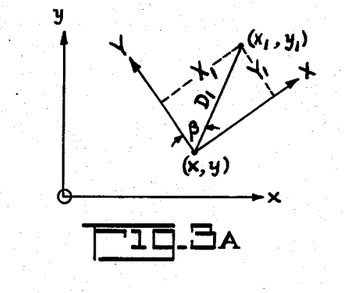
Fig. 3a is vectorial diagram of aircraft location and flight relative to the radio station, explanatory of the relation of some signals produced by the apparatus of Fig. 3.

The internal construction of converter 101 per se forms no part of the present invention; the general manner of generation of its output voltages is likewise indicated in the aforementioned Steiner patent. Stated briefly here, the generation of these voltages involves translation and rotation of co-ordinates in the manner disclosed in the Steiner patent. Referring to Fig. 3a, the instant location of the aircraft with respect to the origin of the illustrated two dimensional x-y co-ordinate system is indicated by co-ordinates (x, y), and that of the selected radio station by co-ordinates $(x_1, y_1)$. The converter 101 functions as follows: The system origin is translated to the instant aircraft location (x, y), and the co-ordinate axes are rotated such that the new Y axis coincides with the aircraft heading. The new $X_1$ and $Y_1$ correspond to the instant location of the station relative to the flight position and flight heading. The ground or bearing distance line $D_1$ interconnects the new origin and the radio station. The indicated angle $\beta=\arctan X_1/Y_1$ is the well-known bearing angle of the aircraft relative to the station, and is also the loop angle when the loop antenna is "fixed" on the station.

Figure 4:
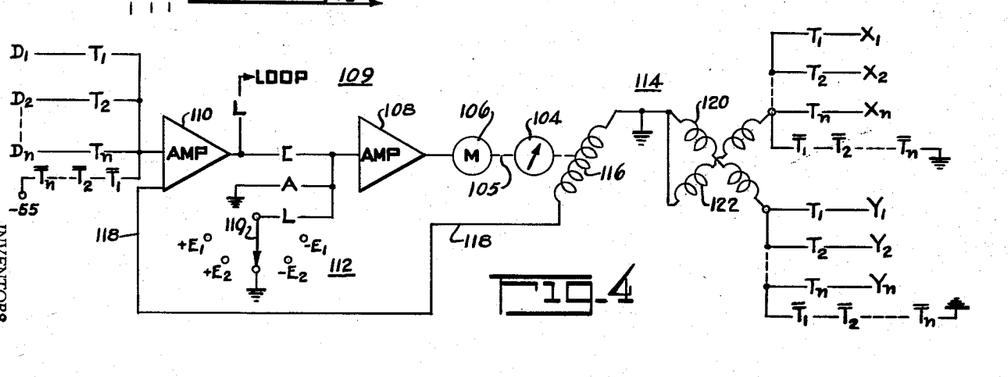
Fig. 4 is a schematic drawing circuitry for loop angle signal generation including the loop angle indicator.

Referring to Fig. 4, the simulated loop angle indicator 104 is actuated by a servo A.C. motor 106 through mechanical connections generally indicated as at 105, which include a suitable gear reduction box (not shown). The motor 106 is energized by a servo A.C. amplifier 108. These elements are constituents of a servomechanism generally indicated as at 109. The servo is disabled in "antenna" operation, behaves as an integrating servo in "loop" operation, and as a position servo in "compass" operation.

When the "Antenna" operational mode is selected by the student, the input of amplifier 108 is grounded through the indicated NO contact of the A relay. In such case the instrument 104 "remembers" its last indication of significance, i.e. the instrument and motor 106 remain in the positions assumed in accordance with the last previous significant input signal applied to amplifier 108 prior to grounding of the amplifier input.

In "Loop" operation the input of amplifier 108 is likewise normally grounded through the indicated NO contact of the L relay, the moveable contact 119 of a five-position selector switch 112 and the indicated grounded stationary contact thereof. In order to deflect the indicator 104 from its "remembered" position to a position of present significance, the student positions switch 112 to effect connection of contact 119 and therefore of the input of amplifier 108 to one of the alternate four stationary switch contacts, which are energized in clockwise order by the A.C. reference voltages $+E_1$, $+E_2$ and $-E_1$, $-E_2$. The voltages $+E_1$ and $-E_1$, and $+E_2$ and $-E_2$ are of like magnitude and opposite phase respectively; also the voltages $+E_1$ and $+E_2$ are of like phase and greater and lesser magnitude respectively.

Application of a reference voltage to the input of amplifier 108 energizes the motor 106 for rotation in one direction or the other in accordance with the polarity of, and at a speed in accordance and with the magnitude of such applied voltage. The indicator 104 accordingly deflects continuously from its "remembered" position for so long as the motor 106 continues to rotate. The motor rotation is terminated by regrounding of the input of amplifier 108 occasioned by release of switch 112 which is of the momentary contact type that reverts, upon such release, from the selected alternate position to the indicated grounded position, and remains thereat without further manual actuation.

The student will generally release switch 112, when as a further consequence of the motor rotation, the receiving apparatus is silenced in the manner hereinafter described, whence the loop antenna is "fixed" on the station tuned in and the indicator 104 reflects the bearing angle $\beta$ subject to the 180° ambiguity. The fact of receiver silence is in itself ambiguous, as the flight may be heading either generally towards or away from the radio station tuned in; the ambiguities are resolved by release of the switch 112, whence the receiver delivers normal audio. The student notes merely whether the signal strength is increasing or decreasing to decide on the general direction of heading. Alternatively the student may tune in another station of generally known location, obtain a bearing indication thereon coupled with receiver silence (subject also to 180° ambiguities), and resolve all ambiguities and simultaneously obtain an accurate indication of flight position by reference to a navigation map.

The discussion in the preceding paragraph presupposes that the receiver is tuned in on one of the available radio aid transmitting stations, and that the flight is within broadcast range of such station; otherwise as will be seen hereinafter, the receiver remains silent continuously.

The receiver silence is effectuated by attainment of zero magnitude of a "Loop" analog A.C. signal obtained at the output of an A.C. amplifier 110 and made available externally of the servo system 109 through the indicated NO contact of the L relay. The manner of generation of the "Loop" voltage will be best understood upon prior consideration of the "Compass (ADF)" operational mode, wherein the input of amplifier 108 receives the loop signal output of amplifier 110 through the indicated NO contact of the C relay, maintained continuously at zero magnitude by circuit means presently described.

The loop signal originates at a resolver 114 whose rotor coil 116 is driven by the motor 106 in unison with the indicator 104 through the connections 105. The upper end of rotor 116 is grounded whereas its lower end is connected via the line 118 to the input of amplifier 110. Resolver 114 is provided with a pair of stator coils 120 and 122 which are arranged in space quadrature. The left ends of the stator coils are grounded, whereas their right ends are respectively energized by the particular pair of the indicated X and Y voltages applicable to the particular tuned in station through indicated NO contacts of the tuning relay associated with such station. As shown, these contacts are arranged in two sets, one each for the several X voltages and for the several Y voltages. The contacts of each set are connected in the alternative. In the event of detuning from all the available stations, the right ends of the stator coils are grounded respectively through the two indicated sets of serially connected NC contacts of each of the several tuning relays.

An X and Y voltage pair applied to the stator coils 120 and 122 induces in rotor 116 the original loop signal voltage which is a trigonometric function of X, Y and the rotor position. This signal is applied via line 118 to the input of amplifier 110 and ultimately in amplified form to the input of amplifier 108, which responsive to the amplified signal energizes motor 106 for rotation thereof, and therefore also indicator 104 and rotor 116, in a direction in accordance with the polarity of the voltage induced in rotor 116, i.e. in a direction so as to minimize such induced voltage and therefore the input voltage to amplifier 108 and the energization voltage for motor 106 effective to cause such rotation. It is apparent that the position of the servo system 109 is free from ambiguity, as the polarity of the voltage induced in rotor 116 is unambiguously determined by the polarities of the inducing X and Y voltages, which polarities are in turn unambiguously determined by the computing means in "back" of such voltages.

The speed of servomotor rotation is proportional to the magnitude of the motor excitation voltage delivered by amplifier 108, and accordingly diminishes progressively with time as the magnitude of the voltage induced in rotor winding 116 shrinks to zero; ultimately the motor 106 comes to rest, and instrument 104 and rotor 116 assume positions indicative of the bearing angle $\beta$. Also the loop signal shrinks to zero. The aforegoing events take place on a continuous basis, so that the bearing angle indication of meter 104 is accurate and unambiguous continuously.

The excitation of motor 106, and also its manner of operation have been described in simplified fashion; the motor is preferably of the two phase type with control winding excited by amplifier 108 and a reference phase winding excited by a fixed reference voltage dephased 90°, and preferably drives a velocity feedback generator that provides a further input signal to the amplifier 108; for a full illustration and description of these arrangements reference is made to the aforesaid Steiner patent.

Reverting to "Loop" operation, it is readily seen that such operation closely parallels "ADF" operation except for manual rather than automatic actuation. The stator windings 120 and 122 induce in rotor 116 a voltage which is a sinusoidal function of the antenna loop angle, shrinking to zero at 0° or 180° loop angle. Such latter angle may result "naturally" because the instant "flight" and "antenna" positions happen to correspond to zero angle as reflected by the magnitudes and polarities of the inducing X and Y voltages and the position of rotor 116. Alternatively the same conditions result responsive to actuation of switch 112.

The loop angle signal reappears in amplified form at the output of amplifier 110, and is applied through the thereat provided NO contact of the L relay ultimately to the receiver proper to control the gain thereof. When the voltage induced in rotor winding 116 shrinks to zero, the corresponding zero "Loop" output voltage silences the receiver, and this serves as command to the student to release switch 112.

The gain of amplifier 110 is automatically controlled by the particular D voltage that corresponds to the tuned in station. Its input is connected to the several negative direct D voltages through the indicated alternatively connected NO contacts of the respective tuning relays. When the ground distance is large, the appropriate D voltage is highly negative and as such is applied as a bias voltage to amplifier 110 to diminish its gain and preclude its overloading. When the ground distance is small, the appropriate voltage approaches zero; this raises the gain of amplifier 110 to an extent sufficient to actuate the servo system 109 even though the loop input signal to the amplifier 110 is small in view of the then small magnitudes of the X and Y voltages exciting the stator windings 120 and 122. In the event of detuning from all the available stations the gain control input of amplifier 110 is connected to the indicated −55 direct bias voltage through the indicated serially connected NC contacts of each of the several tuning relays, thereby cutting amplifier 110 off.

Figures 5, 5A, 5B, 5C:
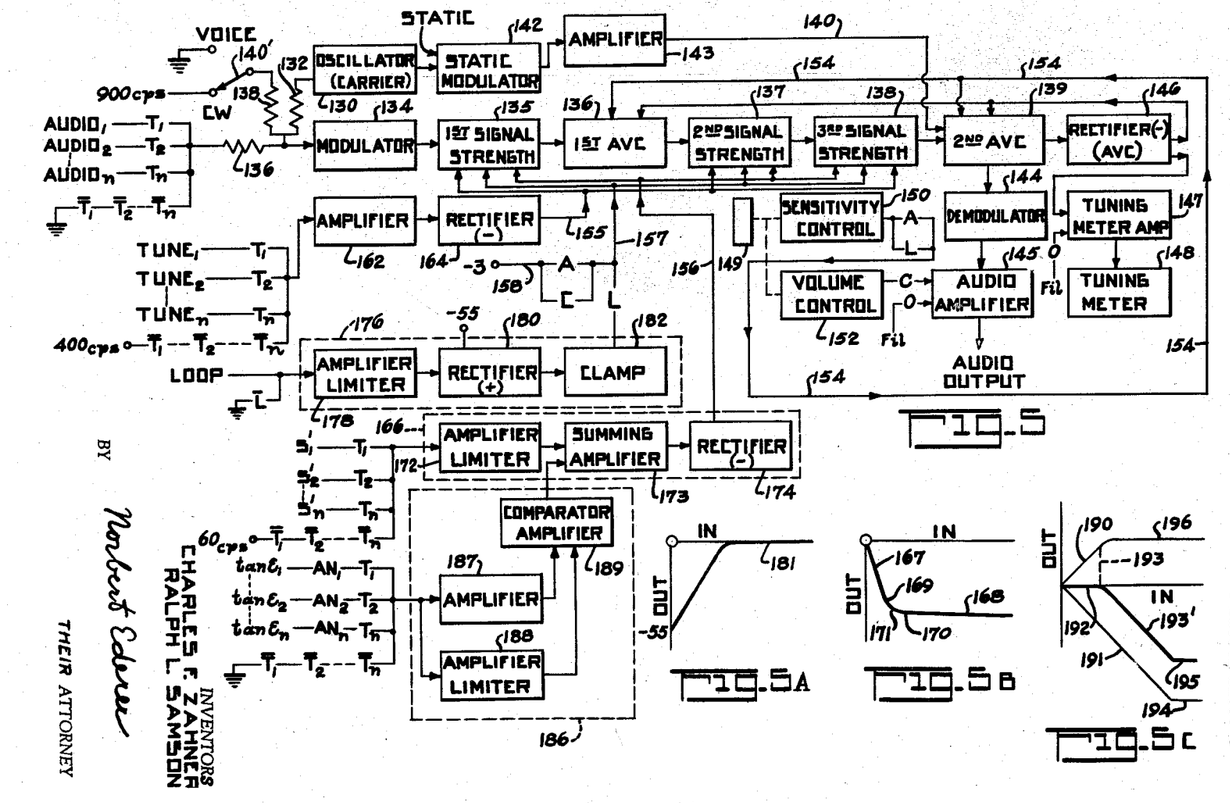
Fig. 5 is a block schematic drawing of the main portion of the receiver proper.
Figs. 5a, 5b and 5c are illustrations of characteristics of response of non-linear function generators of Fig. 5.

Referring to Fig. 5, the receiver proper includes an oscillator 130 which emits a constant amplitude, constant frequency signal, that serves as a carrier for the audio intelligence. The carrier type transmission readily admits of electronic gain control and therefore of the generation of response characteristics closely matching those of an actual receiver, and at the same time avoids the problems of hum and noise inherent in the transmission at intelligence frequency level of the prior art. Any desired supersonic carrier frequency may be employed; in the particular example described the carrier frequency is 40 kc.

The output of carrier generator 130 is fed via a summing resistor 132 to the input of a modulator 134 which also receives via another summing resistor 136 the audio input from the tuned in station through the respective one of the indicated NO contacts of the several tuning relays connected in the alternative. In the event of detuning from all the available stations, the left end of resistor 136 is grounded through the indicated NC contacts of all tuning relays connected in series. The audio signals may include voice signals in the case of broadcast, tower, compass locator, and A–N Range stations; station identifications signals, a 1020 c.p.s. tone keyed in Morse code for compass locator and AN Range stations; the well-known AN Range signals, i.e. the Morse code letters A, N keying a 1020 c.p.s. note, in the case of AN Range station. The generation and selection of the audio signals is under the control of the instructor; he assigns messages and the form of such messages to the particular available stations in accordance with the practices of the actual station simulated. The manner of generation of these signals is well-known and forms no part of the present invention; briefly stated here the voice signals may be live or recorded, whereas the coded messages are generated by suitable keying means and a 1020 c.p.s. tone generator. Elements of such apparatus are described at somewhat greater length in the aforesaid Grandmont and Gallo patents.

In simulation of an actual receiver the modulator 134 is provided with a third possible input applied through a further summing resistor 138 which connects from the input junction to the moveable contact 140' of a student operated "C–W" selector switch which alternatively grounds the upper end of resistor 138 in the case of voice reception and connects the same to a 900 c.p.s. source in the case of reception of coded messages (CW transmission).

The modulator 134 may be of any desired type, for example the well-known diode type modulator. Unit 134 effects amplitude modulation of the carrier with the audio signal; in the case of CW transmission the modulation envelope includes components of 900 c.p.s., 1020 c.p.s. and also components of sum and difference frequencies thereof.

The modulated signal is fed to a five stage amplifier which is fixed tuned to the carrier frequency of 40 kc. Individual amplifier stages are identified by the reference numerals 135 to 139. Since the required amplifier band is relatively narrow, the amplifier may be of the synchronously tuned type described in "Vacuum Tube Amplifiers," by Valley et al., M.I.T. Radiation Laboratory Series, vol 18, published by the McGraw-Hill Book Company in 1948, at page 172 et seq. Electronic gain control signals in the form of variable negative bias voltages are applied to each amplifier stage through respective summing resistors assumed to be contained within each stage.

The magnitudes of the gain control signals are varied in accordance with extent of detuning, with the loop position, slant distance of the aircraft from the radio station, etc. in a manner fully described hereinafter. The stages 135, 137 and 138 are designated "Signal Strength" to signify that the principal gain control effect is in accord with the fictitious radio signal, whereas stages 136 and 139 are denominated "AVC" to signify that the principal effect is due to an automatic volume control voltage having a magnitude in accordance with the strength of the five stage carrier amplifier output signal derived from the final stage 139. The manner of application of the gain control signal to an amplifier stage and the effect thereon has been indicated with reference to amplifier 110 (Fig. 4). For an illustration of circuit means for application of gain control signals to a tuned amplifier reference is made to page 175 of the aforesaid Valley et al. text.

To facilitate the tracing of the carrier and gain control signals, the signal paths of the former are designated by horizontal arrows and those of the latter by vertical arrows at input sides of a respective amplifier. The last stage of amplification 139 receives a carrier input signal over line 140 in addition to the output signal of the stage 138. This additional signal is a 40 kc. signal modulated with noise and static; it originates at a static modulator 142 similar to modulator 134, which receives the 40 kc. also from the oscillator 130 and in addition receives a noise and static signal which may be generated for example by a noise diode or by a commutator-brush type motor. The output of modulator 142 is amplified in a single stage 143 and in amplified form fed over line 140 to amplifier 139. It is to be noted that transmission of the audio modulated carrier requires tuning to one of the available radio stations. Transmission of the static modulation requires no such tuning; quite on the contrary, upon detuning the noise output is quite intense owing to reduction in AVC voltage, as will be apparent hereinafter.

The output of amplifier 139 is fed to a demodulator 144, whose demodulated audio output voltage (including noise and static) is fed to an audio amplifier 145, whose output in turn is fed to an audio output system which forms no part of the present invention and is therefore not shown. Such audio output system generally comprises an intercommunication system which includes means for filtering out all but one of the 900 c.p.s., 1020 c.p.s., and sum and difference frequency notes, and ultimately a speaker or earphones. The amplifier 145 may include one or more stages of vacuum tube amplifiers; the filament supply voltage for the final stage is applied through the indicated NO contact of the O relay to simulate receiver warm up and cooling delays attendant to switching the receiver on and off.

The amplifier 139 also feeds an additional demodulator or rectifier 146, which includes the usual long time constant network for filtering of the audio and is arranged to rectify the negative peaks of the incoming wave so as to provide a negative, direct current type AVC output in accordance with the carrier strength for automatic volume control purposes. The output of the rectifier 146 is fed simultaneously to the AVC stages 136 and 139, and also as an input to a tuning meter amplifier 147, a direct voltage amplifier of conventional construction, whose output drives a suitable tuning meter 148. Again for proper simulation of receiver warm up and cooling delays in the response of tuning meter 148, the output stage of amplifier 147 has heater power supplied through the indicated NO contact of the O relay.

The receiver is provided with a control knob 149 operable by the student for positioning dual potentiometers 150 and 152, the former serving as a sensitivity control in antenna and loop operation, and the latter serving as a volume control in compass operation. Potentiometer 152 is connected through the indicated NO contact of the C relay to the audio amplifier 145 and thus serves as a manual volume control for this amplifier and therefore for the entire receiver under compass operation. The sensitivity control 150 is connected through the indicated NO contact of the A and L relays in the alternative, and line 154 to provide a gain control bias in addition to the AVC bias to the two AVC amplifiers 136 and 139.

Each of the three signal strength amplifiers 135, 137 and 138 receive three bias signals for purposes of gain control. The first such bias signal is applied over line 155 and varies substantially linearly with extent of detuning. The second such bias signal is applied over line 156 and varies non-linearly with modified slant distance S', also referred to as effective slant distance hereinafter. The third such bias signal is applied over line 157. It is fixed at —3 volts in the case of antenna or compass operation and as such is applied to line 157 via line 158 and the indicated NO contacts of the A and C relays connected in the alternative. In loop operation the second signal varies non-linearly with the loop signal. As such it is applied to line 157 via the indicated NO contact of the L relay. The derivation of the tuning, effective slant distance, and loop control bias signals will now be discussed in order.

The several 400 c.p.s. tuning signals are selectively applied to an input of an amplifier 162 through the respective indicated NO contact of tuning relays connected in the alternative, assuming tuning within ±2.5 kc. of the several stations as previously explained. In the event of detuning from all the stations a large 400 c.p.s. signal of fixed and relatively large amplitude is applied to amplifier 162 through the indicated NC contacts of all tuning relays connected in series. The amplifier 162 drives a halfwave rectifier 164 arranged to rectify the negative peaks of the incoming signal, so that with tuning to the exact transmission frequency zero bias is applied to line 155 outgoing from the rectifier 154. With detuning within the 5 kc. band of the station a progressively increasing negative bias signal is applied to line 155. Such increasing negative bias variation is symmetrical on either side of exact on station tuning. The aforesaid 400 c.p.s. fixed amplitude signal produces a large negative bias effective to cut the signal strength stages off.

The several modified or effective slant distance signals are selectively applied to the input of a non-linear function generator 166 through the indicated NO contacts of the respective tuning relays connected in the alternative. In the event of detuning from all the available stations a relatively large and fixed 60 c.p.s. signal is applied through the indicated NC contacts of all tuning relays connected in series. The function generator 166 has the "Limiter function" A.C. input-D.C. output response illustrated in Fig. 5b, to which reference is now made. The essential components of this characteristic are an initial substantially straight line response range 167 and an ultimately substantially flat response range 168. The limit 169 of the linear response range and the limit 170 of initial flat response range may, for purposes of the generic definition of "limiter function" be joined by the rounded curve portion 171, or may coincide, or may consist of a succession of straight line segments of progressively decreasing slope. The generic definition of limiter function generation is intended to cover these various alternatives.

The function generator 166 includes an amplifier-limiter 172 which amplifies the incoming A.C. signal initially linearly, thereby giving rise to the linear response range 167, and thereafter clips the positive and negative peaks of the incoming wave symmetrically beginning with level 169. In the limit the clipping action converts the sine wave to a square wave, giving rise to the asymptotic response 168. The amplifier limiter 172 may comprise any well-known clipper, such as one or more stages of amplifiers each biased approximately mid-way between cut off and saturation, or may include a linear amplifier whose output is applied to well-known clipper comprising biased diodes which do not clip until a peak value conforming to the bias values is exceeded. Alternatively the amplifier-limiter 172 may be a cathode coupled clipper amplifier described in Patent No. 2,821,629. The output of limiter 172 is applied to a linear summing amplifier 173 whose summing feature may be disregarded for the time being, and thence as amplified to a half wave or full wave rectifier 174 arranged to rectify the negative peaks of the incoming wave. The rectified output is reflected in Fig. 5b. It is applied via line 156 to the three signal strength amplifiers 135, 137 and 138.

It should be noted that for purposes of the invention the term amplifier-limiter is not restricted to clipper circuits, nor is the generic definition of limiter function generator restricted to circuitry including clippers or limiters. For example, the invention contemplates as an alternative to the circuitry within the block 166 that the stage 168 comprises a plurality of amplifiers that do not limit, but rather have the output voltage of the rectifier 174 applied thereto as an automatic gain control signal. This alternative arrangement produces essentially the characteristic of Fig. 5b. Further alternatives will be described hereinafter. The range of flat response 168 corresponds to an effective slant distance outside of the maximum transmission range of the tuned-in station, and also reflects the output voltage produced in response to application of the fixed 60 c.p.s. voltage on de-tuning from all stations.

It will be recalled that the loop signal is available externally of the circuitry of Fig. 4 only in loop operation. Under such circumstances the loop signal is applied to the input of another limiter function generator 176; in other than loop operation such input is grounded through the indicated NC contact of the L relay. The function generator 176 includes an amplifier-limiter 178 of any of the types previously or subsequently described, whose output is applied to a half wave rectifier 180 arranged to rectify the positive peaks of the incoming wave in this instance. The rectified positive signal is superimposed on the indicated —55 volt fixed bias signal giving rise to the limiter function response characteristic indicated in Fig. 5a to which reference is now made. At zero loop angle the output of the rectifier 180 is the —55 volt bias voltage; with increasing loop angle the output voltage increases, at first linearly, towards zero volts.

In order to insure that the value of flat response range 181 shall not exceed zero volts, the output of rectifier 180 is fed to clamping circuitry 182 of conventional construction which clamps the output to zero volts. The output of circuitry 182 is fed through the indicated NO contact of the L relay via line 157 to the three signal strength amplifiers 135, 137 and 138.

It will be recalled that upon detuning from all stations the fixed 400 c.p.s. signal applied to the input of amplifier 162 in combination with the fixed 60 c.p.s. signal applied to function generator 166 are ultimately effective to cut off the three signal strength stages 135, 137 and 138. In such case the final stage 139 receives merely static modulated carrier that results in a high level of static audio output. Under conditions of loop operation, assuming proper tuning, even when the loop angle is zero, the resultant —55 volt bias on line 157 is not of itself sufficient to cut the signal strength amplifiers off, owing to the contribution to bias of these signal strength stages by the tuning and effective slant distance signals. The gain of the five stage carrier amplifier is greatly reduced under the latter conditions; nevertheless a relatively faint audio signal is perceived even at the "silence" nulls of 0° or 180° loop angles, that partially over-rides the static output. The student may increase the intensity of such output by operation of the control knob 149.

For purposes of simulation of the well-known cone of silence effect associated with AN range stations only, there is provided a further non-linear function generator 186, whose input is selectively connected to the several tan ε voltages through the alternatively connected series pairs of respective AN and tuning relays. In the event of detuning from all the stations, the input of function generator 186 is grounded through the indicated NC contacts of all tuning relays connected in series.

The function generator 186 includes an amplifier 187 and an amplifier-limiter 188 of any of the previously or subsequently described types, each receiving the appropriate tan ε input signals. The outputs of the stages 187 and 188 are fed to an input of a comparison amplifier 189 whose output in turn is fed to the summing amplifier 173. To this end it is necessary in the present instance to provide within the amplifier-limiter 188 a low pass or band pass filter to restore the clipped waves to sine waves. The amplifiers 187 and 188 are arranged to have equal gain in the range of linear response of amplifier 188, indicated in Fig. 5c as at 190. Also the outputs of the amplifiers 187 and 188 are arranged to be phase opposition to one another, as indicated by the straight line characteristic 191 applicable to the amplifier 188 that is of equal but opposite slope to the straight line portion 190. The comparator amplifier 189 produces an output that is the algebraic summation of the output of amplifier 187 and 188, and is therefore zero in the range of linear response of amplifier 188, as indicated by the heavy line segment 192 in Fig. 5b. A non-zero output response commences at the level 193, which level corresponds to initial clipping of the incoming waves by the amplifier 188. Beginning with level 193 the output of amplifier 189 follows the generally straight line characteristic 193' which is of the same slope as the characteristic 191. The amplifier 187 ultimately saturates in the region corresponding to very large elevation angles, i.e. very nearly directly above the station, and this gives rise to the horizontal line segment 194 in the response characteristic of amplifier 187, and consequently to a similar segment 195 in the response characteristic of amplifier 189.

The function generator 186 will for purposes of the present invention be referred to as an amplitude-sensitive-amplifier. The characteristic response curve of an amplitude sensitive amplifier as comprehended herein are as a minimum, a region of substantially zero or other constant output corresponding to 192, and a region of substantially linear output corresponding to 193. The manner of junction of the regions and also any additional characteristic such as 195 are not essential for qualification within this definition. Accordingly the amplitude sensitive function may alternatively be generated as follows: The limiter amplifier 188 is replaced by a voltage source providing an A.C. reference voltage of fixed magnitude and phase opposite to the phase of the voltage amplified by amplifier 187. A relay is provided that senses whether the output of amplifier 187 is at least equal to, or less than the reference voltage. A set of contacts of such relay is connected in the output circuit of comparison amplifier 189, alternatively to connect the respective input of summnig amplifier 173 to the output of amplifier 189, and to ground, in accord with the respective conditions sensed by the relay. The switching action takes place at a level corresponding to level 193.

It is apparent that the flat response 196 of amplifier 188 is not essential for generation of the amplitude sensitive amplification function; all that is necessary for essential generation of the characteristic 193 is that a response of a slope differing from that of segment 190 be provided in place of response 196. Accordingly the amplifier-limiter 188 may be replaced by a so-called "multilinear" or "multiple slope" amplifier, more specifically herein by a "bilinear" or "dual slope" amplifier, whose characteristic initially follows the linear response range characteristic 190 relative to characteristic 191, but whose gain is changed at a level corresponding to level 193. To this end means are provided for comparing the output voltage of the bilinear amplifier 188 with a fixed reference voltage of magnitude corresponding to level 193 and phase opposite to such output voltage. At level 193 the net compared voltage is zero; this is sensed by a suitable relay that is effective to change the gain of the amplifier 188, doubling it for example, as by switching in or out of a resistor included in a voltage divider circuit of the amplifier, or included in the amplifier load circuit or in a feed back circuit. The relay simultaneously connects the reference voltage as a further input voltage to the comparator amplifier 189. For an example of a bilinear alternating voltage amplifier that does not require relays, reference is made to an application of R. L. Samson, one of the applicants herein, Serial No. 836,472, filed August 27, 1959.

The output of amplifier 189 is summed with the output of amplifier 172 in the summing amplifier 173; is thence, as amplified, rectified in unit 174 and as such is applied as bias to the three signal strength stages 135, 137 and 138. The summing feature of amplifier 173 is not essential; if desired the respective inputs to amplifier 173 could be applied to rectifier 172 in the alternative. This is readily understood with reference now to Fig. 6.

Figure 6:
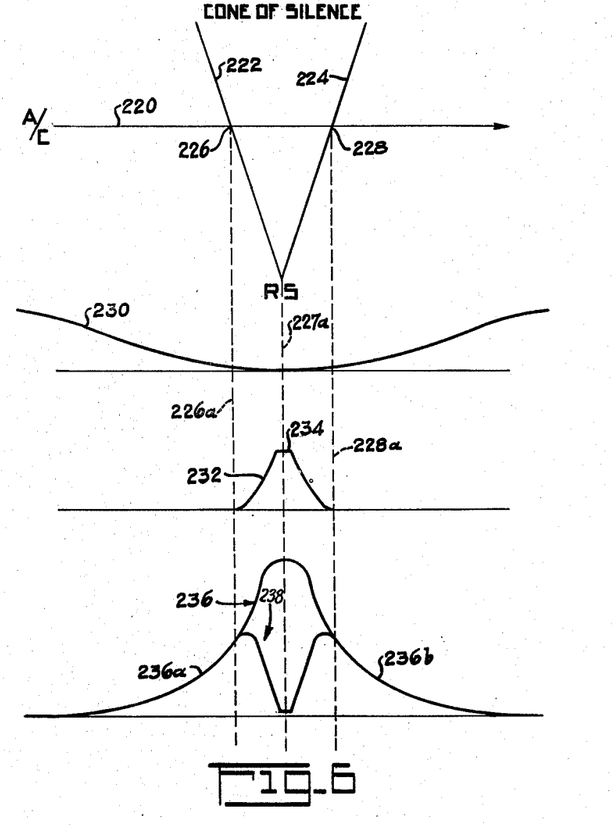
Fig. 6 is an illustration of the receiver characteristics with flight distance from the simulated radio station including response with and without cone of silence effect.

In Fig. 6 the flight path is indicated by horizontal line 220, and the cone of silence is defined by the two slant lines 222 and 224 originating at radio station RS. The aircraft enters the cone of silence at point 226 and leaves the same at point 228. For ease of recognition of correspondence of the remaining curves of Fig. 6 dashed vertical lines 226a, 227a and 228a are drawn through the points 226, RS and 228 respectively. The curve 230 illustrates the response of the rectifier 172 due to the effective slant distance signal S' only, as though the radio station were not an AN range station. It is seen that a relatively large signal is obtained remote from the station, and that the signal approaches zero in proximity to the station. The curve 232 illustrates the output of rectifier 172 due to elevation angle signal only. It is seen that outside the cone of silence the voltage contribution is essentially zero, and is appreciable within the cone of silence. This is to be expected because outside of the cone of silence the elevation angle is very small. The flat top portion 234 is due to the saturation effect of the amplifier 187 with ever increasing signal in the immediate vicinity of the radio station. Thus the slant distance and elevation angle contributions are pronounced in mutually exclusive regions. The receiver response curve for a non-AN range station (without cone of silence) is illustrated by curve 236, which represents the usual receiver fading curve. The response is maximum in the vicinity of the radio station and approaches zero remote from the station. The portions 236a and 236b are common also to the characteristic curve 238 of an AN range station (with cone of silence) up to the limits of the cone of silence as defined by the lines 226a and 228a. In the immediate vicinity of the station the signal strength approaches zero symmetrically from either side, giving rise to a pair of peaks just within the cone of silence limits.

The described simulated radio receiver matches accurately the performance of an actual receiver particularly with regard to response to detuning, flight position, slant distance, cone of silence characteristics, operational mode selection, noise and static effects automatic volume control characteristics, sensitivity, manual volume control, and warmup.

Many modifications of the apparatus herein described are possible. For example, as previously mentioned, the basic analog voltages giving rise to the gain control voltages could be direct rather than alternating. In such case the generation of the aforesaid limiter function proves to be very simple; the increasingly negative analog voltage is applied to a conventional direct-voltage amplifier, ultimately cutting the same off to produce the flat response region. Such an amplifier may be readily combined with a suitable linear amplifier to produce the aforesaid amplitude sensitive amplifier characteristics. Accordingly it is intended that the definitions of limiter, limiter function generator, amplitude sensitive amplification be applicable to direct voltage systems as well.

It should be understood that this invention is not limited to specific details of construction and arrangement thereof herein illustrated, and that changes and modifications may occur to one skilled in the art without departing from the spirit of the invention.

What is claimed is:

1. In a grounded aircraft trainer having computing means for producing a control signal determinative of the signal strength of a simulated radio navigational aids transmitter: an improved simulated radio receiving system comprising a source of audio signals representing a message from said transmitter, a carrier generator for producing a carrier signal at a fixed supersonic frequency, means for modulating said carrier signal with said audio signals, a cascade of amplifier stages for amplifying the modulated signal, means for applying said control signal as an electronic gain control signal to at least one of said stages, means for demodulating the amplified signal and providing a demodulated audio signal, said demodulating means including a long time constant network providing a demodulated direct current type signal in accordance with the carrier strength, and means for applying the latter demodulated signal as an electronic automatic volume control signal to at least one of said stages.

2. In a grounded aircraft trainer having computing means for producing a plurality of control signals determinative of the signal strength of a simulated radio navigational aids transmitter: an improved simulated radio receiving system comprising a source of audio signals representing a message from said transmitter, a carrier generator for producing a carrier signal at a fixed supersonic frequency, means for modulating said carrier signal with said audio signals, a cascade of amplifier stages for amplifying the modulated signal, a plurality of electronic function generators for applying direct current type gain control signals as functions of the aforesaid control signals to at least one of said stages, means for demodulating the amplified signal and providing a demodulated audio signal, said demodulating means including a long time constant network providing a demodulated direct current type signal in accordance with the carrier strength, and means for applying the latter demodulated signal as an electronic automatic volume control signal to at least one of said stages.

3. In a grounded aircraft trainer including a simulated aircraft radio receiving system comprising a simulated tuning control positionable by the student for producing a "student tuning frequency" electrical signal variable with the positioning thereof in accordance with the fictitious frequency to which said radio receiver is tuned, and a plurality of circuit means, each for simulating characteristics of an associated simulated radio navigational aids transmitting station, each of said circuit means provided with a control settable by the instructor for producing an "instructor tuning frequency" electrical signal variable with setting thereof in accordance with the fictitious transmission frequency of the associated station, comparison means for producing a tuning signal representative of the difference of said student and associated instructor tuning frequency signals, tuning relay means adapted to transfer from a "tuned in" switching state to a "detuned" switching state responsive to said difference signal attaining the limits of the tuning band for the associated station, and a source of audio signals representing a message from the associated station; and further including computing means producing a plurality of electrical signals respectively representative of the distance of the simulated flight from said stations: the improvement comprising a carrier generator for producing a carrier signal at a fixed supersonic frequency, a modulator, means for applying said carrier signal to said modulator, means for selectively applying the audio signals of the tuned in transmitting station through the therewith associated "tuned in" relay means to said modulator to modulate said carrier with the last-mentioned audio signals, means for selectively applying the tuning signal associated with the last-mentioned station through the last-mentioned relay means as an electronic gain control signal to at least one of said stages, electronic function generating means for applying an electronic gain control signal as a function of an input signal applied thereto to at least one of said stages, means for selectively applying the distance signal associated with the last-mentioned station through said last-mentioned relay means as an input signal to said function generating means, means for demodulating the amplified signal and providing a demodulated audio signal, said demodulating means including a long time constant network providing a direct current type demodulated signal, and means for applying the latter demodulated signal as an automatic gain control signal to at least one of said stages.

4. The combination as defined in claim 3, further provided with a source of simulated receiver noise signal, a second modulator for modulating the carrier with said noise signal, and means to apply said noise modulated signal to one of the amplifier stages.

5. The combination as defined in claim 3, the function generating means being a non-linear function generator.

6. The combination as defined in claim 5, the non-linear function generator being a limiter function generator.

7. The combination as defined in claim 6, wherein the limiter function generator includes an amplifier-limiter.

8. The combination as defined in claim 5, wherein the distance signals are alternating voltage signals, and the non-linear function generator means includes means for clipping the input signal applied thereto, and means for rectifying the clipped signal, said rectified signal being the distance gain control signal.

9. The combination as defined in claim 5, wherein the distance signals are alternating voltage signals, and the non-linear function generator means includes means for non-linearly amplifying the input signal applied thereto, means for rectifying the last-mentioned amplified signal, said rectified signal being the distance gain control signal, and means for applying said rectified signal as an automatic gain control signal to the last-mentioned amplifying means.

10. The combination as defined in claim 4, including means for applying through all said relay means in the "detuned" state thereof a fixed signal to the function generating means corresponding to a large flight-to-station distance, whereby transmission of the carrier signal from the first-mentioned modulator is attenuated and the demodulated noise is accentuated.

11. The combination as defined in claim 3, further provided with a student-operable selector switch to select "antenna," "compass," and "loop" antenna operational modes, and means operable upon "loop" selection for seeking receiver signal silence comprising further student operable switching means, servo means responsive to the aforesaid computing means for producing a signal representative of the angular position of a simulated aircraft directional antenna relative to the station tuned in and adapted to render said angular position signal extreme in magnitude responsive to operation of said further switching means to represent fixing of said directional antenna on said tuned in station subject to a 180° ambiguity, and electronic means for generating and applying to at least one of the aforesaid stages an electronic gain control signal that is a non-linear function of said angular position signal and effective substantially to silence said receiver when said angular position signal is of said extreme magnitude.

12. The combination as defined in claim 3, wherein the aforesaid computing means provides a further signal representative of the elevation angle of the simulated flight with respect to the tuned in station, further provided with means for silencing the receiver in proximity to said latter station in simulation of cone of silence effects comprising electronic means for generating and applying to at least one of the aforesaid stages an electronic gain control signal that is a non-linear function of said elevation angle signal effective substantially to silence said receiver for large elevation angles corresponding to proximity of the flight to said station.

13. The combination as defined in claim 12 wherein the non-linear function generator is an amplitude sensitive amplifier.

14. The combination as defined in claim 13 wherein the amplitude sensitive amplifier comprises a substantially linear amplifier and an amplifier-limiter both energized by the aforesaid elevation angle signal, and means for combining the output signals of said linear amplifier and amplifier-limiter whereby the resultant gain control signal is substantially constant in the range of linear amplification of said amplifier-limiter corresponding to location of the flight without the cone of silence.

15. The combination as defined in claim 13 wherein the amplitude sensitive amplifier comprises a substantially linear amplifier and a multiple slope amplifier both energized by the aforesaid elevation angle signal, and means for combining the output signals of the latter two amplifiers, whereby the resultant gain control signal is substantially constant in the range of one of the amplification slopes of said multiple slope amplifier.

References Cited in the file of this patent

UNITED STATES PATENTS

| | | |
|---|---|---|
| 2,435,502 | Lang | Feb. 3, 1948 |
| 2,514,602 | Grandmont | July 11, 1950 |
| 2,529,468 | Dehmel | Nov. 7, 1950 |
| 2,685,747 | Hicken | Aug. 10, 1954 |
| 2,721,397 | Gallo | Oct. 25, 1955 |
| 2,730,815 | Gallo | Jan. 17, 1956 |
| 2,811,788 | Gallo | Nov. 5, 1957 |
| 2,846,780 | Gallo | Aug. 12, 1958 |